Jan. 3, 1950 — A. W. HEINO — 2,493,194
MANUFACTURE OF BONDED FIBER MATS
Filed Nov. 29, 1946
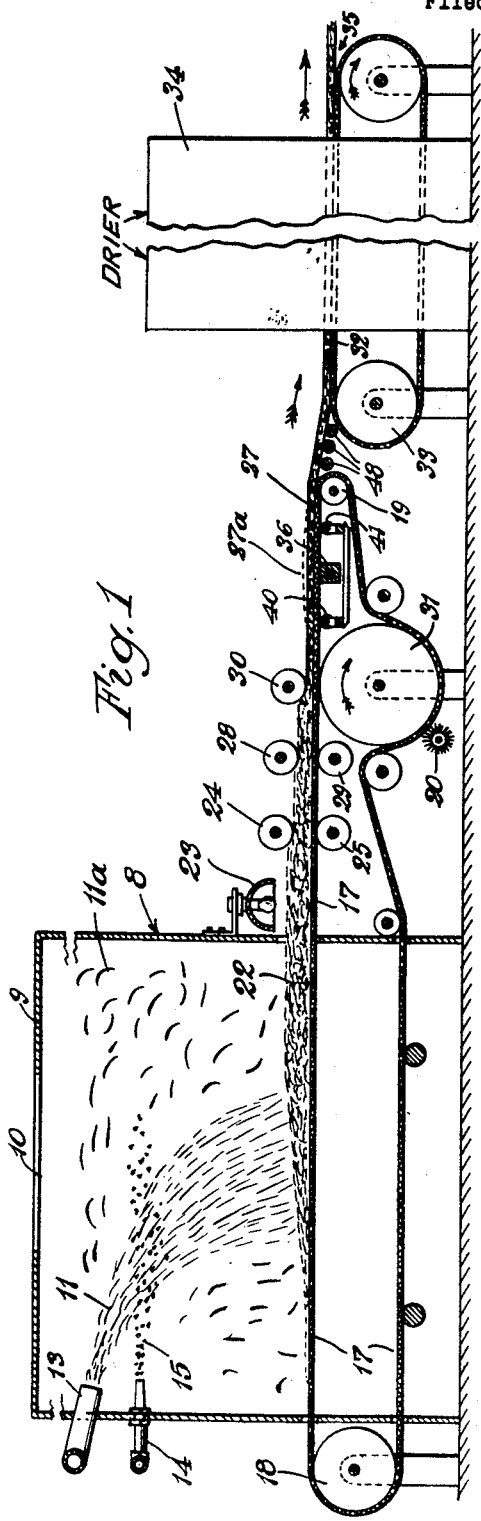
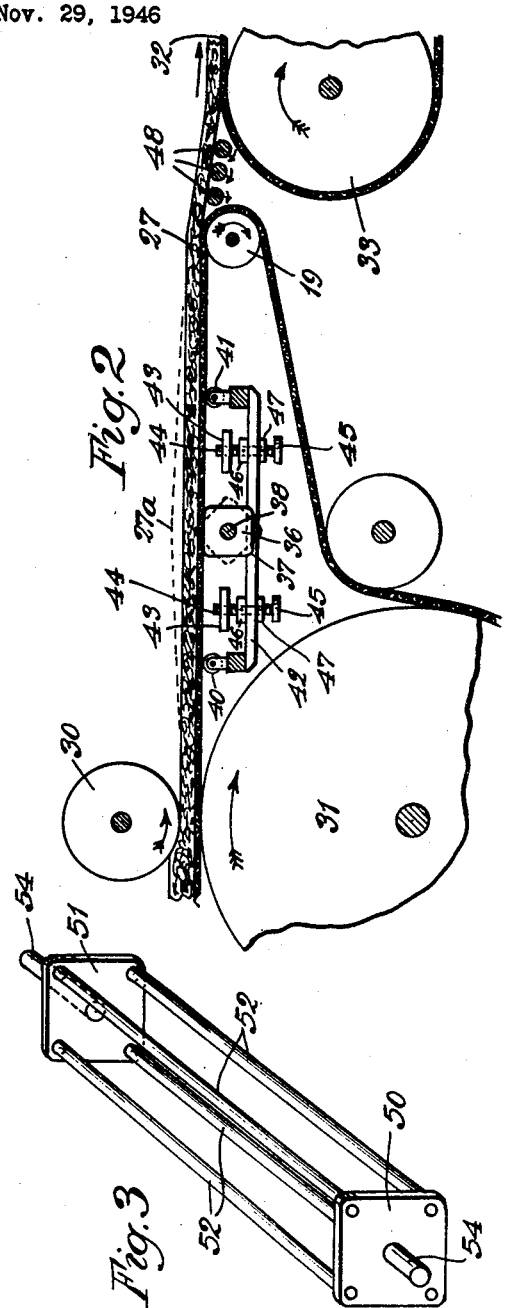
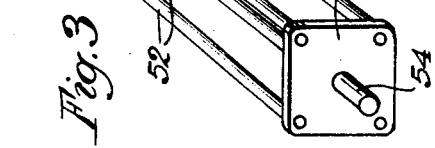
Inventor
Arne W. Heino
by W. Bartlett Jones,
Attorney.

Patented Jan. 3, 1950

2,493,194

UNITED STATES PATENT OFFICE 2,493,194

MANUFACTURE OF BONDED FIBER MATS

Arne W. Heino, Cloquet, Minn., assignor to Wood Conversion Company, St. Paul, Minn., a corporation of Delaware Application November 29, 1946, Serial No. 713,150

15 Claims. (Cl. 154—29)

The present invention relates to the manufacture of bonded low-density fiber felts of the character produced by forming a blanket-like deposit of short fibers, having lengths of the order of ultimate wood fibers, carrying liquid adhesive, and then drying the resulting low-density felt to bind the fibers together. In particular, the invention relates to transfer of the undried mat from a moving conveyer on which the blanket is formed to a second moving conveyer on which the transferred mat is dried.

By the well-known processes of depositing substantially individualized fibers, which are wet with adhesive of a character which can be dried to bind the fibers together, a liquid-carrying low-density fiber mat can be formed which is so delicate and mobile that it cannot be readily handled or manipulated. Such delicate mats have substantially no tensile strength in the undried form, and acquire it only after setting of the adhesive bond. Therefore, it has been a practice heretofore to form such mats initially on a continuously moving endless conveyer belt, usually a wire screen, and to run such belt through a drier, the screen providing openings to facilitate the drying on the supported face of the mat. Thereafter, the dried mat is peeled from the belt. However, difficulties have been experienced because the mat becomes dried adhesively to the belt, and frequently portions are torn from the mat and stick to the belt. This results largely from the fact that in the process of forming the initial mat by depositing adhesive-carrying fibers, or by spraying adhesive on deposited fibers as they deposit, the resulting mat is a but-slightly felted aggregate including integrally therewith the forming belt. Where this belt is a wire screen as conventionally employed, it follows that there is a felted integral union between the fiber mass and the screen. This union makes it difficult to effect a separation of mat and screen until the mat acquires substantial tensile strength, either by additional felting by subsequent compression, or by drying the wet bonding agent, or by both methods. When the wet undried mat is not separated from its integral union with the forming belt, or wire screen, the strength of union between the two is increased in the drying operation.

The present invention overcomes the difficulties above set forth and additionally presents numerous advantages.

It is the object of the present invention to provide a continuous endless conveyer or forming belt, and an independent continuous endless conveyer or drying belt, and to remove the undried mat from the forming belt to the drying belt.

It is a particular object of the invention to provide transfer mechanism to assist in the transfer of the undried mat from the forming belt to the drying belt.

It is a particular object of the invention to effect a substantial disengagement of the undried mat from the forming belt before finally removing the mat from the belt, and to do this by bouncing the forming belt in its transit while carrying the mat.

It is another object of the invention to loosen the undried mat from its forming belt by a bouncing action, and then to assist transfer of the mat from its forming belt to a drying conveyer belt by providing for a slight drop in level with spaced driving supports for the mat in the transfer space.

Another object of the invention is to provide adjusting mechanism to modify the extent of bouncing practiced on the forming conveyer.

Another object is to form and dry a moist mat of fibers on a conveyer screen, so that it is readily removable without that degree of adherence to the screen which results in tearing the mat on removal by pulling away the mat.

Numerous other and ancillary objects and advantages of the invention will become apparent from the following description and explanation of the invention as it is set forth in the presently preferred embodiment thereof illustrated in the drawing, in which:

Fig. 1 is a diagrammatic representation of the principal features of one apparatus for forming the fiber mats to which the invention is applicable.

Fig. 2 is a detailed view of a portion of the apparatus shown in Fig. 1, illustrating the principal features of the apparatus of the present invention.

Fig. 3 is a modified form of a rotary bouncer.

The general process for forming the fiber mat involves the well-known principle of depositing from gaseous suspension substantially individualized fibers in any manner to form a continuous layer of substantially uniform thickness and density. When the fibers are deposited, a liquid adhesive agent is present on the fibers. This may be effected by letting the spray fall upon the fibers already deposited and as they deposit, but preferably it is accomplished by injecting a fine spray into a gaseous atmosphere in which the individual fibers are suspended so that the fibers pick up the adhesive spray particles, and then are deposited as fibers wet with adhesive. It is also well-known that the density of the resulting deposit and also the degree of felting of the fibers are both greater as the velocity or inertia of the fibers is increased at the instant of deposit. In the preferred practices to which the present invention is applicable, the adhesive-carrying fibers are allowed to deposit from an air suspension by the force of gravity. The result is the formation of a mat of very low density and of substantially no tensile strength and very little resistance to initial compression. The deposit is much like a blanket of snow resulting from a gentle fall of dry snow. Such a low-density deposit may be dried without any predrying compression, but the resulting dried mat is of little commercial value, because the degree of felting is so low and the tensile strength resulting from the drying of the binder is also so low that the mat is one of only special utility, being too delicate for practical commercial uses. It is, therefore, common practice to compress the initially deposited gravity-formed undried mat to decrease the thickness and increase the density so that when dry it has ruggedness as well as useful properties.

A wire screen is the conventional forming conveyer on which the fibers are deposited and carried forward as a wet mat and on which to expose the mat to a compression means where it is desired to densify the mat. In forming the mat on a wire screen, many fibers project through the interstices of the screen and otherwise associate themselves with the wire elements of the screen with the net result that the resulting felt practically embodies the wires of the screen. The union of the mat to the wire is commonly stronger than the tensile strength of the upper portions of the mat, largely because the screen itself is a unit and has strength. Any attempt physically to hold or grasp the mat to remove it from the screen, at the usual desirable forming densities of the mat, fails to effect desired separation, and merely breaks the mat.

Even though the mat is compressed before attempts are made to separate it from its union with the forming conveyer, removal of the mat from the conveyer still is not practicable because the act of compression not only increases the strength of the mat itself, but increases the bond of the compressed mat to the conveyer. Even though the inter-fiber felting is increased by the compression, and even though such felting is one way to increase tensile strength, it should be borne in mind that the liquid adhesive serves to keep the fibers straighter than in their normal dried condition and also to lubricate the contact points between the fibers, thus adding to the weakness of the structure.

For these reasons, the fiber mat has been carried through the drying oven on the conveyer belt, or wire screen, on which it has been formed. Various expedients have been employed to minimize adhesion of the dried mat to the said conveyer.

The present invention provides means and a method for effectively separating the undried mat from the forming conveyer belt and for transferring the separated mat to a drying conveyer, with the unexpected result that the dried mat is easily removed from the drying conveyer. The principle of initial separation of mat and conveyer depends to a degree upon inertia. As the undried mat moves along on the forming conveyer which has become integrated to it, the forming conveyer is bounced rapidly in a direction substantially normal to its direction of movement. This results in moving the mat and the belt as a whole in the direction of the bouncing impact. The return action effects a cleavage along the interface of the mat and the forming conveyer. By suitable bouncing, the whole mat is well loosened, without any necessity to grasp the mat and thereby compress it or disturb its structure. The mat once loosened on the conveyer is then carried in this loosened relation by the conveyer to a point of final separation where the mat is transferred to the drier conveyer.

Certain mats, according to density, may be readily transferred at the same level from one conveyer to the other over a small space or gap between such conveyers, but other mats are so weak in tension that they may break at the transfer point, of course, depending upon the length of gap. The present invention involves means to support the relatively weak mats against such breakage, such means involving one or more small diameter supporting rolls moving at the same peripheral speed as the mat. Additionally, it has been found that the transfer is still further facilitated at the transfer point by lowering the level of the drying conveyer with respect to the forming conveyer, and placing a plurality of supporting rolls on an inclined path from one conveyer level to the other.

Since apparatus employing the invention may be utilized for producing bound fiber blankets having a wide range of densities and of thicknesses, means is provided for adjusting the degree of bounce to accommodate the action to a particular blanket being formed. Therefore, the preferred embodiment of the invention involves apparatus having fixed bouncing means capable of effecting a maximum bounce, and in connection therewith adjustable means acting to change the relative relation between the bouncing means and the conveyer bounced by it to adjust the extent of bounce.

The process above described in its generalities may be carried out in apparatus such as that shown in Fig. 1. The numeral 8 designates a large forming chamber having considerable height to minimize festooning of moist fibers at the top 9, which may be open in whole or in part as an air vent, as shown at 10. Substantially individualized fibers 11 are injected into chamber 8 by suitable means such as one or more of nozzles 13. The fibers 11 are preferably introduced in a moving stream of air in which the fibers are individualized and suspended, and such stream of air expands, thereby dispersing the fibers. Many of these fibers move out of the general zone of the fiber trajectories indicated by the heavy lines and become fugitive fibers 11a moving about within the chamber 8. Numeral 14 represents one or more of liquid spray nozzles for introducing a spray or mist of liquid adhesive particles 15. Preferably, the adhesive is an aqueous solution containing dissolved or dispersed solids which provide the ultimate bond. Starch dispersions are suitable, as well as dispersions of glues, proteins, and resin-forming solids. An aqueous dispersion of a reactive phenol-formaldehyde condensation product is most preferred for giving water resistance to the resin-bound mat issuing from an oven drier, in which oven drier the said condensation product is reacted to form a bonding resin.

In the bottom of the chamber 8 there is a stretch of an endless wire screen 17 which at the rear of and outside of the chamber passes over return roll 18 and which forward of and outside of the chamber passes over a small return roll 19, said screen 17 being suitably returned between said rolls 18 and 19 to provide an endless conveyer. On the return stretch of the screen 17 there is provided a rotary brush 20 which cleans residual fibers from the screen 17 after the separation of the present invention is accomplished.

The fibers build up a mat on the screen 17 as the latter moves slowly through the bottom of the chamber 8. The mat is designated by the numeral 22 at the point where it leaves the chamber, this mat being, for example, about six inches thick and having a density of approximately .4 pound (dry weight) per cubic foot. The thickness and density vary according to the final thickness and density desired at the end of the drier.

The fibers of the issuing mat 22 are substantially piled one upon the other with but slight interfelting and are wet with adhesive. If attempt is made to compress the mat there is little resistance to initial compression, and there is a high tendency of the topmost wet fibers to adhere to compressing means. This tendency to adhesion is lessened as the degree of compression increases by reason of the resulting interfelting of the topmost and all of the fibers. Therefore, for slight compressions, it is desirable to minimize the adhesiveness of the top fibers. This may be done by providing radiant heating means in the form of radiant heat lamps 23 playing upon the top surface of the mat in advance of a compression roll 24 placed above screen supporting backing roll 25 for effecting a slight compression. It has been found that certain properties of an ultimate compressed mat are desirably improved if roll compression takes place in stages. Accordingly, three roll-compression steps are illustrated to reduce the mat 22 to a compressed mat 27 shown over the return roll 19 of Fig. 1. The second step of compression is accomplished between the rolls 28 and 29, and the third step of compression is performed between the rolls 30 and 31, the latter being a large roll for numerous other functions, for example, as a backing-roll for brush-roll 20.

After the said last compression by roll 30 on the forming wire 17, it is desirable to transfer the mat 27 to a different conveyer 32 passing over roll 33 to carry the mat into a drier 34, conventionally indicated, for discharge at 35. Preferably the level of drier belt 32 is lower than the level of the forming conveyer 17, the drop being such as to give an inclined transfer space pitched downwardly about one inch vertically per horizontal foot.

Between the roll 31 and the return roll 19, means is provided for bouncing the forming conveyer 17. Numerous mechanical expedients may be employed to strike the underside of the conveyer 17 with a quick beating action. The preferred device is a rotary member having bouncing or striking elements thereon which strike and raise the conveyer as the rotary element turns and as the conveyer advances. A simple device is one with four such striking elements in its circumference, such as is formed by a substantially square bar 36 with rounded corners 37. Bar 36 herein is referred to as a bounce roll. It is preferably mounted so that its flat side between any two striking corners 37 is at or below the normal lowest level of the conveyer 17 in its travel along the path between roll 31 and roll 19. It is obvious that a change of the size of the square bounce roll, or a vertical displacement of its horizontal axis, will change the degree of displacement of the conveyer 17 at each strike by the roll. With a given roll and a fixed mounting, the extent of bounce may be modified by change of distance between the normal level of the conveyer and the bounce-roll axis. Means are provided for adjusting the normal distance of the axis 38 of the bounce roll from the travel path of the screen 17. Such means constitutes two spaced idler roll supports 40 and 41 for the conveyer 17, between which supports the bounce roll 36 is located. Merely by raising and lowering the supports 40 and 41 equally or unequally, either one or both, an operator may effect an adjustment of the effective bounce.

Any suitable means may be provided for so adjusting the supports 40 and 41. One way is to mount the two roll supports 40 and 41 on a carrying yoke 42 which yoke is adjustably fixed at two spaced places with reference to the machine frame 43. Threaded into the frame 43 there are screw shafts 44 having handwheel heads 45. Shaft 44 passes rotatably through yoke member 42 which is fixed between two collars 46 and 47 pinned to shaft 44.

The bounce effects a loosening of the mat 27 from the conveyer 17. The mat 27 being light does not return after the bounce as quickly as does the wire 17. Thus the separation is effected. The dotted line 27ª indicates the raised level of the mat 27 effected by the bounce. Accordingly, at the idler roll 19 the loosened mat may be readily separated from the conveyer 17. But although readily separable, it has little self-supporting strength, and variously needs bottom support while in motion across a transfer space to the level of the drier support 32. In the space to be traversed by the mat without conveyer belt support, one or more of small rolls 48 are provided suitably powered to have a peripheral speed along with and equal to the linear speed of the mat 27. Preferably, there is a plurality of rolls 48, contained in a unit (not shown) alining them in a plane as shown, thus to support the mat 27 at numerous spaced points. The mat has a tendency to droop between supports, and by providing a slight drop for the mat during transfer and while being supported by the rolls 44 this tendency is used to advantage by using the force of gravity as a moving force on the mat, and thus to prevent the tendency to droop from disrupting the mat.

Fig. 3 represents a modified form of bounce roll in which two end plates 50 and 51 carry four striking round bars 52 arranged in the form of a square. A suitable axis 54 is provided for mounting and driving the bounce roll. It is of course, to be understood that the illustrated square form of the bounce roll 36 and of the bounce roll of Fig. 3, is no limitation. Any number of striking elements from one upwardly, could be used while retaining the rotary form. It is further to be understood that the rotary form is not at all a limitation of the invention, and that other movements of one or more striking means may be provided. It is preferable that a considerable stretch receive a bouncing impact to lift a considerable area of the mat from the conveyer. Preferably a linear stretch across the whole conveyer is bounced at one impact by the means shown.

When a mat is made from cellulosic fibers derived from wood, of which a large quantity is derived from sulfite screenings, and when the adhesive employed is a phenol-formaldehyde resin-forming condensation product in the amount from about 7 to 25 parts by weight of resin-forming solids in a 7% solution in water, to 100 parts by weight of dry fiber, a gravity deposition process may readily form an initial mat about 5 inches thick at a density of about 0.4 pound (dry weight) per cubic foot. Such a mat may be compressed to one approximately one inch thick at the point of transfer in the present invention. Such a compressed mat will have a density of about two pounds per cubic foot (dry weight). Greater or less initial thickness and density may be effected as well as greater or less thickness and density at transfer. With such a composition as above referred to, it is practically impossible to effect transfer of the initially deposited mat having a density of about ½ pound (dry weight) per cubic foot. However, upon compression, as by the means shown, to a density of about .8 pound cubic foot, the mat acquires sufficient self-sustaining tensile strength to resist the transfer action described. At about one pound density such a mat is quite readily transferable, giving little difficulty with breakage in commercial production.

The separation of the wet mat from the forming conveyor and the placement of the separated mat upon the drying conveyer, resultingly gives little adhesion of the dried mat to the drying conveyer. Accordingly, the dried mat is readily removed without disruption of the mat. Were the wet mat compressed onto the drying conveyer, the interface would be a far more perfect adhesion in drying. The invention involves removal of the mat from the forming support after the loosening, because insofar as the loosening is imperfect by reason of the bouncing action, it is completed by the removal action. There may be some residual unloosened areas after the bouncing action and if separation at these areas is not effected, the bond to the support on drying is so strong as to lead to disruption of the mat. In practice, therefore, the bouncing to effect initial loosening, and then the complete separation, followed by resting the removed mat on a second support for drying, is a simple and satisfactory way to prevent mat-tearing adhesion of the dried mat to a drying support.

Numerous modifications of the invention are contemplated as falling within the scope of the appended claims.

I claim:

1. Apparatus for separating a loosely felted wet fiber mat from an endless conveyer belt to which said mat is resultingly united in formation thereon by a continued deposition from a gaseous medium of substantially individualized fibers, comprising means for moving said forming conveyer belt and the mat thereon continuously in a substantially horizontal direction and planewise of the belt toward a region at which the mat and the belt are to be separated, means for imparting a bouncing impact to the underside of the conveyer belt for producing motion of the belt and mat in a substantially vertical direction before the affected portion reaches said region of separation, whereby the different forces acting on the belt and on the mat to return them after an impact effect a weakening of the union between the mat and the belt whereby the mat is readily removed from the belt, and moving means to receive, support and carry away the mat as it is discharged and separated from the belt.

2. Apparatus for separating a loosely felted wet fiber mat from an endless wire screen conveyer belt to which said mat is resultingly united in formation thereon by a continued deposition from a gaseous medium of substantially individualized fibers, comprising means for moving said screen conveyer belt and the mat thereon continuously in a substantially horizontal direction and planewise of the belt toward a region at which the mat and the belt are to be separated, means for imparting a bouncing impact to the underside of the conveyer belt for producing motion of the belt and mat in a substantially vertical direction before the affected portion reaches said region of separation, whereby the different forces acting on the felt and on the mat to return them after an impact effect a weakening of the union between the mat and the screen belt whereby the mat is readily removed from the screen belt, and moving means to receive, support and carry away the mat as it is discharged and separated from the screen belt.

3. Apparatus for separating a loosely felted wet fiber mat from an endless conveyer belt to which said mat is resultingly united in formation thereon by a continued deposition from a gaseous medium of substantially individualized fibers in building up said mat, comprising means for moving said forming conveyer belt and the mat thereon continuously in a substantially horizontal direction and planewise of the belt toward a region at which the mat and the belt are to be separated, rotary means for imparting a bouncing impact to the underside of the conveyer belt for producing motion of the belt and mat in a substantially vertical direction before the affected portion reaches said region of separation, whereby the different forces acting on the belt and on the mat to return them after an impact effect a weakening of the union between the mat and the belt whereby the mat is readily removed from the belt, and moving means to receive, support and carry away the mat as it is discharged and separated from the belt.

4. Apparatus for separating a loosely felted wet fiber mat from an endless wire screen conveyer belt to which said mat is resultingly united in formation thereon by a continued deposition from a gaseous medium of substantially individualized fibers, comprising means for moving said screen conveyer belt and the mat thereon continuously in a substantially horizontal direction and planewise of the belt toward a region at which the mat and the belt are to be separated, rotary means for imparting a bouncing impact to the underside of the conveyer belt for producing motion of the belt and mat in a substantially vertical direction before the affected portion reaches said region of separation, whereby the different forces acting on the belt and on the mat to return them after an impact effect a weakening of the union between the mat and the screen belt whereby the mat is readily removed from the screen belt, and moving means to receive, support and carry away the mat as it is discharged and separated from the screen belt.

5. Apparatus for separating a loosely felted wet fiber mat from an endless conveyer belt to which said mat is resultingly united in formation thereon by a continued deposition from a gaseous medium of substantially individualized fibers, comprising means for moving said forming conveyor belt and the mat thereon continuously in a substantially horizontal direction and planewise of the belt toward a region at which the mat and the belt are to be separated, means for imparting a bouncing impact to the underside of the conveyor belt for producing motion of the belt and mat in a substantially vertical direction before the affected portion reaches said region of separation, whereby the different forces acting on the belt and on the mat to return them after an impact effect a weakening of the union between the mat and the belt whereby the mat is readily removed from the belt, a moving endless foraminous conveyor belt to receive and support the mat after it is discharged and separated from the forming conveyor for carrying the wet mat through a drying oven, and one or more conveying and supporting rolls for the mat in the transfer and travel gap between said two conveyors, the transfer of the mat from the forming conveyor to the drying conveyor serving to minimize adherence of the dried mat to the drying conveyor.

6. Apparatus for separating a loosely felted wet fiber mat from an endless wire screen conveyor belt to which said mat is resultingly united in formation thereon by a continued deposition from a gaseous medium of substantially individualized fibers comprising means for moving said screen conveyor belt and the mat thereon continuously in a substantially horizontal direction and planewise of the belt toward a region at which the mat and the belt are to be separated, means for imparting a bouncing impact to the underside of the conveyor belt for producing motion of the belt and mat in a substantially vertical direction before the effected portion reaches said region of separation, whereby the different forces acting on the conveyor and on the mat to return them after an impact effect a weakening of the union between the mat and the screen belt whereby the mat is readily removed from the screen belt, a second endless wire screen conveyor to receive and support the mat after it is discharged and separated from the forming conveyor, and one or more conveying and supporting rolls for the mat in the transfer and travel gap between said two screen conveyors, the transfer of the mat from the forming screen conveyor to the drying screen conveyor serving to minimize adherence of the dried mat to the drying screen conveyor.

7. The method which comprises continuously depositing substantially individualized fibers of vegetable origin and adhesive-bearing liquid onto a stretch of an endless forming conveyor belt moving in a substantially horizontal direction and thereby building up on said belt a thickness of wet loosely felted fiber mat characterized by lack of appreciable tensile strength, whereby in formation the mat is integrated to the surface of the belt, bouncing the moving belt and carried mat in a substantially vertical direction whereby to effect a weakening of the union between the mat and the belt, thereafter separating the belt and the loosened mat thereon, rceiving and carrying away the removed mat, and drying the mat on a moving endless belt therefor whereby the dried mat is readily removable.

8. The method which comprises continuously depositing substantially individualized fibers of vegetable origin and adhesive-bearing liquid onto a stretch of an endless wire screen conveyor belt moving in a substantially horizontal direction and thereby building up on said belt a thickness of wet loosely felted fiber mat characterized by lack of appreciable tensile strength, whereby in formation the mat is integrated to the wire elements of the screen belt, bouncing the moving belt and carried mat in a substantially vertical direction whereby to effect a weakening of the union between the mat and the belt, thereafter separating the belt and the loosened mat thereon, receiving and carrying away the removed mat, and drying the mat on a moving endless belt therefor, whereby the dried mat is readily removable.

9. The method which comprises continuously depositing substantially individualized fibers of vegetable origin and adhesive-bearing liquid onto a stretch of an endless forming conveyor belt moving in a substantially horizontal direction and thereby building up on said belt a thickness of wet loosely felted fiber mat characterized by lack of appreciable tensile strength, whereby in formation the mat is integrated to the surface of the belt, continuously beating the underside of the moving belt whereby to bounce the belt and the carried mat in a substantially vertical direction and thereby to effect a weakening of the union between the mat and the belt, thereafter separating the belt and the loosened mat thereon, receiving and carrying away the removed mat, and drying the mat on a moving endless belt therefor whereby the dried mat is readily removed.

10. The method which comprises continuously depositing substantially individualized fibers of vegetable origin and adhesive-bearing liquid onto a stretch of an endless wire screen conveyor belt moving in a substantially horizontal direction and thereby building up on said belt a thickness of wet loosely felted fiber mat characterized by lack of appreciable tensile strength, whereby in formation the mat is integrated to the surface and to wire elements of the screen belt, bouncing the moving belt and carried mat in a substantially vertical direction whereby to effect a weakening of the union between the mat and the belt, thereafter separating the belt and the loosened mat thereon, transferring the removed mat to a second wire screen conveyor therefor, and drying said wet mat on said second wire screen, whereby the dried mat is readily removable from the second wire screen.

11. The method which comprises forming a wet mat of fibers of vegetable origin by depositing substantially individualized fibers and a bonding quantity of adhesive-carrying liquid onto a forming support and thereby integrating the wet mat and the support at the interface, loosening the wet mat from the support by an impact on the support effecting a bounce of both the mat and the support, removing the wet mat from the support, and drying the removed mat.

12. The method which comprises forming a wet mat of fibers of vegetable origin by depositing substantially individualized fibers and a bonding quantity of adhesive-carrying liquid onto a forming support and thereby integrating the wet mat and the support at the interface, compressing the wet mat on the said support whereby to strengthen the mat and incidentally to strengthen the union of the mat to the support, loosening the wet mat from the support by an impact on the support effecting a bounce of both the mat and the support, removing the wet mat from the support, and drying the removed mat.

13. The method which comprises forming a wet mat of fibers of vegetable origin by continuously depositing substantially individualized fibers and a bonding quantity of adhesive-carrying liquid onto a moving endless conveyer belt and thereby integrating the wet mat and the belt at the interface, loosening the wet mat from the belt by repeatedly striking the underside of the moving belt with impacts effecting a bounce of the belt and the mat thereon, continuously removing the loosened wet mat from the moving belt, and drying the removed mat.

14. The method which comprises forming a wet mat of fibers of vegetable origin by continuously depositing substantially individualized fibers and a bonding quantity of adhesive-carrying liquid onto a moving endless conveyer belt and thereby integrating the wet mat and the belt at the interface, compressing the wet mat on the moving belt whereby to strengthen the mat and incidentally to strengthen the union of the mat and the belt, loosening the wet mat from the belt by repeatedly striking the underside of the moving belt with impacts effecting a bounce of the belt and the mat thereon, continuously removing the loosened wet mat from the moving belt, and drying the removed mat.

15. In apparatus of the character described having an endless conveyer belt for carrying a wet low-density fiber mat formed thereon, the combination with said endless conveyer of positive impact means positioned to strike the underside of the belt for weakening the union of the wet mat and the belt by effecting a bounce of the belt and the carried mat, and mat-supporting and carrying means positioned to effect separation of the loosened wet mat and the belt.

ARNE W. HEINO.

REFERENCES CITED

The following references are of record in the file of this patent:

UNITED STATES PATENTS

| Number | Name | Date |
| --- | --- | --- |
| 1,657,414 | Silver | Jan. 24, 1928 |
| 1,899,056 | Powell | Feb. 28, 1933 |
| 2,110,280 | Vieweg | Mar. 8, 1938 |
| 2,192,917 | Kleist | Mar. 12, 1940 |
| 2,197,610 | Fedeler | Apr. 16, 1940 |